United States Patent [19]

Nagumo

[11] Patent Number: 4,506,294
[45] Date of Patent: Mar. 19, 1985

[54] SOLID STATE CAMERA

[75] Inventor: Fumio Nagumo, Atsugi, Japan

[73] Assignee: Sony Corporation, Tokyo, Japan

[21] Appl. No.: 465,052

[22] Filed: Feb. 9, 1983

[30] Foreign Application Priority Data

Feb. 10, 1982 [JP] Japan .................................. 57-19975

[51] Int. Cl.³ .............................................. H04N 9/09
[52] U.S. Cl. ............................................... 358/50
[58] Field of Search ............................................ 358/50

[56] References Cited

U.S. PATENT DOCUMENTS

| 4,183,052 | 1/1980 | Yamanaka et al. | 358/50 |
| 4,249,203 | 2/1981 | Yamanaka | 358/50 |
| 4,322,740 | 3/1982 | Takemoto et al. | 358/50 |

*Primary Examiner*—Richard Murray
*Attorney, Agent, or Firm*—Hill, Van Santen, Steadman & Simpson

[57] ABSTRACT

A solid state camera is disclosed which includes a plurality of image sensors, each having a plurality of picture sensing units spaced apart by an alignment pitch, a projector for projecting an image simultaneously on each of said image sensors, the image on each sensor being displaced by a predetermined distance in a given direction with respect to at least one other of the sensors, the picture sensing units being read for reading the respective images sequentially in the given direction and for generating video signals representing the respective images, a sampler for sampling each of the video signals by a sampling signal and for generating sampled signals, a converter for converting the sampled signals to digital signals, an interpolator for interpolating a signal generated from the digital signal during adjacent two samples between the adjacent two samples in each video signal and for generating interpolated outputs so that the group delay characteristics of the outputs are substantially equivalent, and a synthesizer for synthesizing the interpolated outputs and for generating a desired signal.

9 Claims, 43 Drawing Figures

FIG. 5D

| $\bar{R}$ | $R_1$ | $\frac{1}{2}(R_1+R_3)$ | $R_3$ | $\frac{1}{2}(R_3+R_5)$ |
| --- | --- | --- | --- | --- |
| $\bar{B}$ | $B_1$ | $\frac{1}{2}(B_1+B_3)$ | $B_3$ | $\frac{1}{2}(B_3+B_5)$ |
| $\bar{G}$ | $\frac{1}{2}(G_0-G_2)$ | $G_2$ | $\frac{1}{2}(G_2+G_4)$ | $G_4$ |
| Y | $Y_1$ | $Y_2$ | $Y_3$ | $Y_4$ |

FIG. 5E

| | $R_1$ | $R_1$ | $R_3$ | $R_3$ | $R_5$ |
| --- | --- | --- | --- | --- | --- |
| | $B_1$ | $B_1$ | $B_3$ | $B_3$ | $B_5$ |
| | $G_0$ | $G_2$ | $G_2$ | $G_4$ | $G_4$ |
| Y | | $Y_{1.5}$ | $Y_{2.5}$ | $Y_{3.5}$ | |

FIG. 8H $\overline{R}$: $(R_0)$, $R_1$, $(R_2)$, $R_3$, $(R_4)$, $R_5$

FIG. 8I $\overline{G}$: $G_0$, $(G_1)$, $G_2$, $(G_3)$, $G_4$, $(G_5)$

FIG. 8J $\overline{B}$: $(B_0)$, $B_1$, $(B_2)$, $B_3$, $(B_4)$, $B_5$ $1/f_{sc}$

FIG. 11G $\bar{R}$

FIG. 11H $\bar{G}$

FIG. 12

| | | | | |
|---|---|---|---|---|
| $\overline{R}$ | $R_1$ | $\frac{1}{3}(2R_1+R_4)$ | $\frac{1}{3}(R_1+2R_4)$ | $R_4$ |
| $\overline{B}$ | $\frac{1}{3}(B_1+2B_2)$ | $B_2$ | $\frac{1}{3}(2B_2+B_5)$ | $\frac{1}{3}(B_2+2B_5)$ |
| $\overline{G}$ | $\frac{1}{3}(2G_0+G_3)$ | $\frac{1}{3}(G_0+2G_3)$ | $G_3$ | $\frac{1}{3}(2G_3+G_6)$ |
| | $L_1$ | $M_2$ | $N_3$ | $L_4$ |

Width: $1/f_{sc}$

| | | | | | |
|---|---|---|---|---|---|
| $\overline{R}$ | $R_1$ | $(R_2)$ | $R_3$ | $(R_4)$ | $R_5$ |
| $\overline{B}$ | $(B_1)$ | $B_2$ | $(B_3)$ | $B_4$ | $(B_5)$ |
| $G$ | $G_1$ | $G_2$ | $G_3$ | $G_4$ | $G_5$ |

SOLID STATE CAMERA

BACKGROUND OF THE INVENTION

1. Field of the Invention

The present invention relates generally to a solid state camera which picks up an object by displacing the image thereof and particularly to a solid state camera in which one or two image sensors are used to generate three primary color signals.

2. Description of the Prior Art

Figure 1:
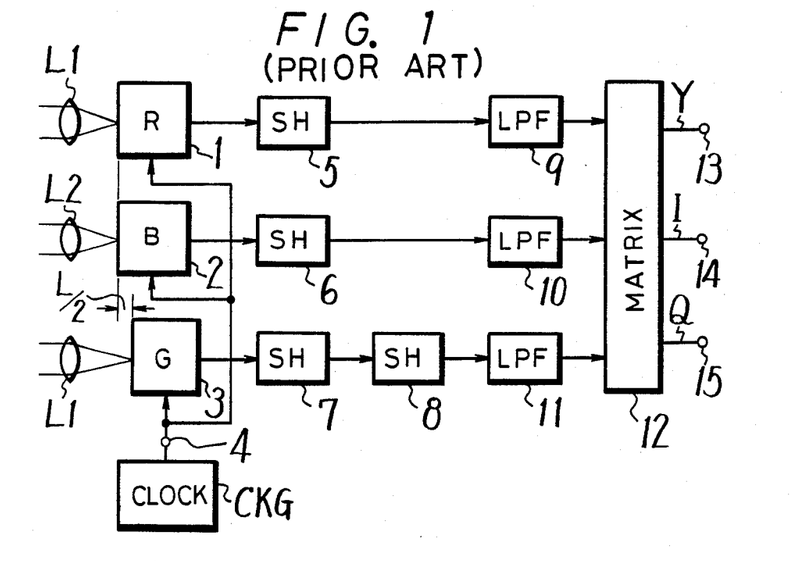
FIG. 1 is a block diagram showing an analog signal processing circuit for use with a prior art CCD camera.
Figures 2A, 2B:
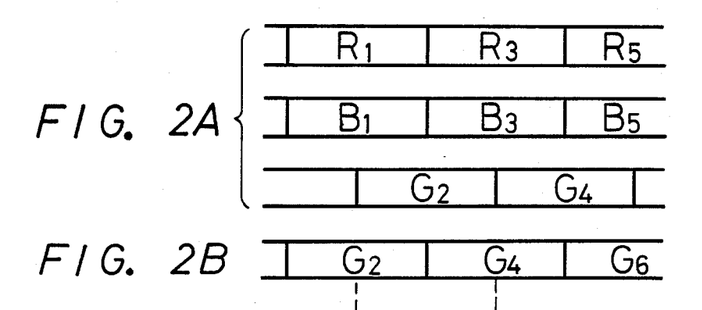
FIGS. 2A to 2E are time charts used to explain the circuit shown in FIG. 1.
Figure 2C:
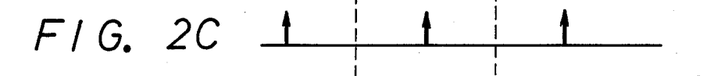
Figure 2D:
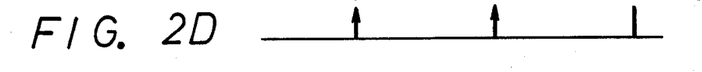
Figure 2E:
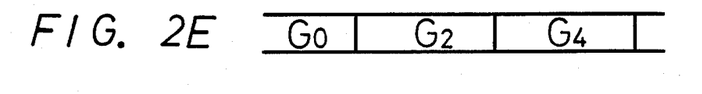

A prior art analog signal processing circuit for use with a CCD (charge-coupled device) camera having a plurality of picture sensing units, which employs a pick-up method by displaying an image by one-half of an alignment pitch of picture sensing units, is constructed as shown in FIG. 1. In this figure, reference numerals 1, 2 and 3 respectively show CCDs which generate R(red), B(blue) and G(green) signals of an object whose image is projected thereon through optical lenses L1, L2 and L3. These CCDs 1, 2 and 3 are respectively driven by a common drive clock with the frequency of 2 fsc (fsc is the frequency of a color sub-carrier) supplied thereto from a clock generator CKG through a terminal 4, and the CCDs 1 and 2 are displaced from the CCD 3 in the lateral direction at the pick-up position by one-half of the alignment pitch L of the picture sensing units. The outputs from these CCDs 1, 2 and 3 are respectively supplied to sample and holding circuits 5, 6 and 7. The sampled data corresponding to respective picture sensing units of the CCDs 1 and 2 are coincident with each other at spatial position as shown in FIG. 2A by $R_1, R_3, R_5, \ldots$ and $B_1, B_3, B_5, \ldots$, while the sampled data of the CCD 3 are displaced by $\frac{1}{2}$ alignment pitch of the picture sensing unit as shown by $G_2, G_4, \ldots$ also in FIG. 2A. However, since the CCD 1, 2 and 3 are driven by the common clock, the G signal derived from the CCD 3 is coincident with the R and B signals in timing as shown in FIG. 2B. Thus, the outputs from the CCDs 1 and 2 are respectively fed through the sample and holding circuits 5, 6 and low pass filters (post filters) 9, 10 with the band of, for example, 0.5 MHz to a matrix circuit 12, while the output from the CCD 3 is fed through the sample and holding circuit 7, a sample and holding circuit 8 and a low pass filter (post filter) 11 to the matrix circuit 12. FIG. 2C shows a sample pulse with the period of $\frac{1}{2}$ fsc for the sample and holding circuits 5, 6 and 7, while FIG. 2D shows a sample pulse for the sample and holding circuit 8. By the latter sample pulse, the G signal is delayed by the period of $\frac{1}{4}$ fsc corresponding to the $\frac{1}{2}$ alignment pitch of the picture sensing units, made as the G signal corresponding to the picked-up position shown in FIG. 2E and then supplied to the matrix circuit 12. At output terminals 13, 14 and 15 led out from the matrix circuit 12 respectively obtained are a Y(luminance) signal and two color difference signals I and Q.

The color signals are processed as the analog signal set forth above and after passing through the low pass filters 9, 10 and 11 they are subjected to the matrix operation. Then, sampled outputs $R_{2n+1}$ and $B_{2n+1}$ of the R and B signals and a corresponding sampled output $G_{2n+1}$ of the G signal are synthesized so that an error similar to misregistration is not caused. In other words, the component of $G_{2n+1}$ is not read out from the CCD 3, but interpolated due to passing through the low pass filter 11 and then the sampled output corresponding to the $G_{2n+1}$ is obtained from the low pass filter 11.

Figure 3A:
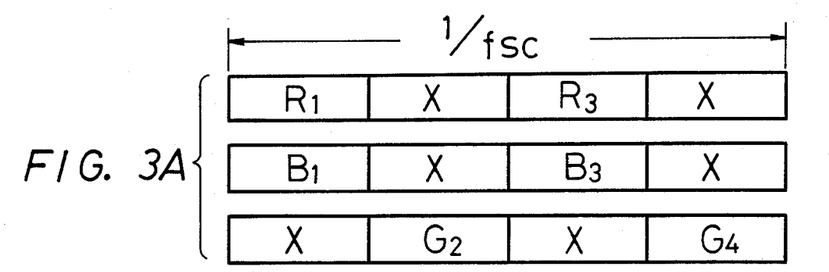
FIGS. 3A to 3D are time charts used to explain a digital processing of the signals from the CCD camera shown in FIG. 1.
Figure 3B:
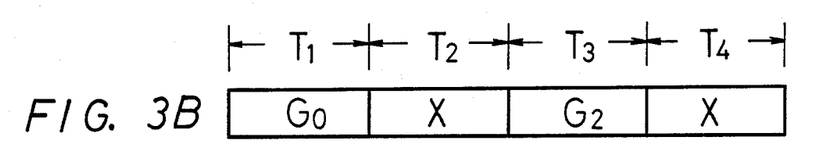
Figure 3C:
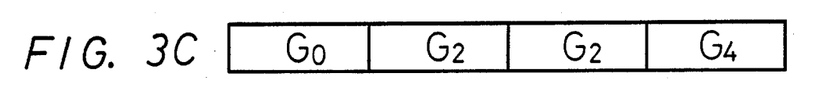
Figure 3D:
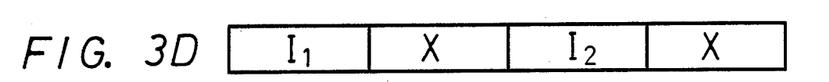
Figure 4:
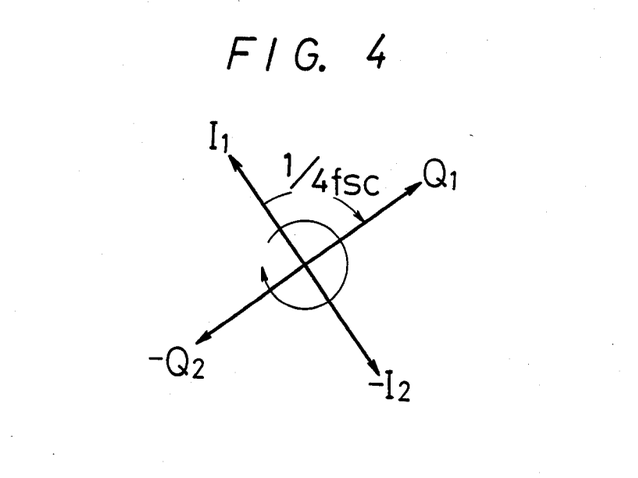
FIG. 4 is a vector diagram thereof.

Now, such a case is considered that the outputs from the CCDs 1, 2 and 3 of the pick-up method where the image is displaced as mentioned above are sampled and then converted to digital data. FIG. 3A shows the sampling positions of the CCDs 1, 2 and 3 in which a symbol "X" represents a holding period (which is same in the following description and drawings). Further, in order to carry out a digital modulation represented by a circulating vector in which one color difference signal i.e. I signal and the other color difference signal i.e. Q signal alternately exist with the period of $\frac{1}{4}$ fsc as shown in FIG. 4, 2 fsc is necessary as the respective data rate of the I and Q signals. To this end, the I signal is produced at timings of $T_1$ and $T_3$ in FIG. 3A and the Q signal is produced at timings $T_2$ and $T_4$ in FIG. 3A. In this case, since there is no G signal in the timings $T_1$ and $T_3$, by delaying the original G signal by $\frac{1}{4}$ fsc, obtained are signals shown in FIG. 3B. Then, these signals and the original are synthesized to produce G signals shown in FIG. 3C, and then the G signals thus produced are used to provide the I signal shown in FIG. 3D. If the delay element is taken as $$Z^{-1}(=\exp\{-(j\omega/4\text{fsc})\})$$

factors or coefficients, $$\tilde{I} = r \cdot R + b \cdot B + g \cdot G \cdot Z^{-1}$$

is established. In other words, an error similar to the misregistration of ($\frac{1}{4}$ fsc $\approx$ 70 n sec) is generated. This fact is entirely similar to the Q signal.

OBJECTS AND SUMMARY OF THE INVENTION

Accordingly, an object of the present invention is to provide a solid state camera free from the defect inherent to the prior art.

Another object of the invention is to provide a solid state camera which resolves a problem of the position displacement between color signals caused when the signals from a color camera, in which the spatial sampling position is different among the color signals as set forth above, is processed digitally.

According to an aspect of the present invention there is provided a solid state camera which comprises:
(A) a plurality of image sensors, each having a plurality of picture sensing units spaced apart by an alignment pitch;
(B) means for projecting an image simultaneously on each of said image sensors,
(C) means for displacing the image on each sensor by a predetermined distance in a given direction with respect to at least one other of said sensors,
(D) reading means coupled to said picture sensing units for reading said respective images sequentially in said given direction and for generating video signals representing said respective images;
(E) means for sampling each of said video signals by a sampling signal and for generating sampled signals,
(F) means for converting said sampled signals to digital signals;
(G) means for interpolating a signal generated from the digital signal during adjacent two samples between said adjacent two samples in each video signal and for generating interpolated outputs so that the group delay characteristics of said outputs are substantially equivalent, and (H) means for synthesizing said interpolated outputs and for generating a desired signal.

The other objects, features and advantages of the present invention will become apparent from the following description taken in conjunction with the accompanying drawings through which the like references designate the same elements and parts.

DESCRIPTION OF THE PREFERRED EMBODIMENTS

The present invention will be described hereinbelow with reference to the attached drawings.

At first, the signal processing manner according to the present invention will be described with reference to FIGS. 5A to 5E.

Figure 5A:
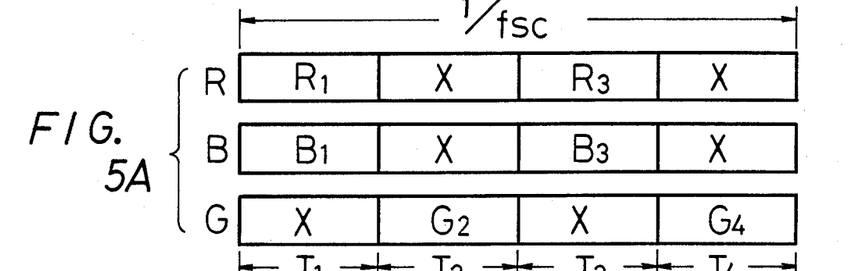
FIGS. 5A to 5E are time charts used to explain the signal processing manner according to the invention.

FIG. 5A shows the sampling positions of three CCDs which pick up an image under displacing the image by $\frac{1}{2}$ alignment pitch of picture sensing units similar to the prior art. In this case, in order to provide the I signal at the timings of $T_1$ and $T_3$, the G signal shown in FIG. 5B by G'' is provided by an average value interpolation. This signal G'' is expressed as follows:

$$G'' = \frac{1}{2}(Z^{-1} + Z)$$

$$G \equiv H_1(\omega) \cdot G$$

$$H_1(\omega) = \frac{1}{2}(Z^{-1} + Z) = \cos\left(\frac{\omega}{4 fsc}\right)$$

Figure 5B:
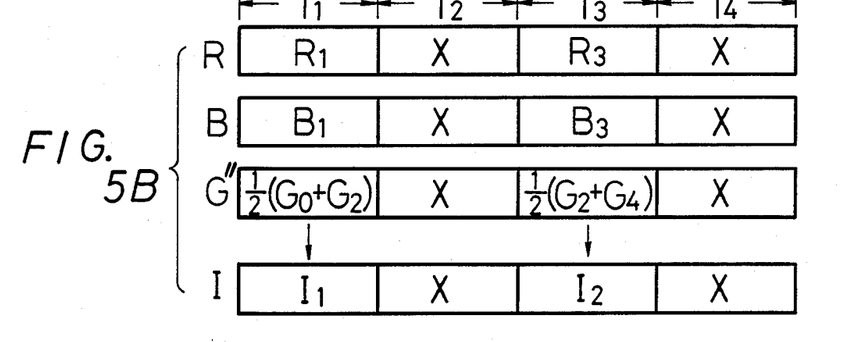

Since the components of the signal G'' in the periods of $T_2$ and $T_4$ have no relation to the generation of the I signal, they are held or are or unchanged as the original data. Then, the I signal is provided by the following calculation:

$$I = r \cdot R + b \cdot B + H_1(\omega) \cdot g \cdot G$$

Figure 6:
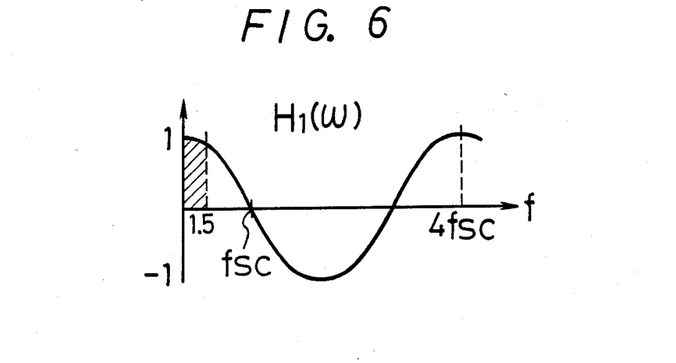
FIG. 6 is a graph showing a frequency characteristic.

In this case, since the term $H_1(\omega)$ contains no phase delay component, the I signal can be produced from three color signals, each having an equal group delay time. Thus, there is not caused an error similar to the misregistration by a delay error. Further, in the graph of FIG. 6 showing the frequency characteristic of $H_1(\omega)$, since $H_1(\omega) \approx 1$ is established in the frequency band (1.5 MHz) of the I signal as indicated by hatches in the graph, the difference in the amplitude characteristic proposes almost no problem.

Figure 5C:
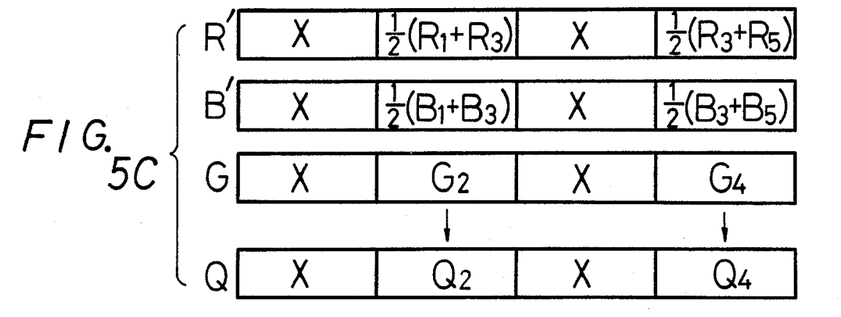

FIG. 5C shows the generation of the Q signal, in which in the periods $T_2$ and $T_4$ there are provided an R signal R' and a B signal B' wherein average value interpolated data exist respectively and the Q signal is provided by these interpolated signals and the original G signal. In case of this Q signal, similar to the above I signal, the generation of an error same as the misregistration can be avoided.

Figure 5D:
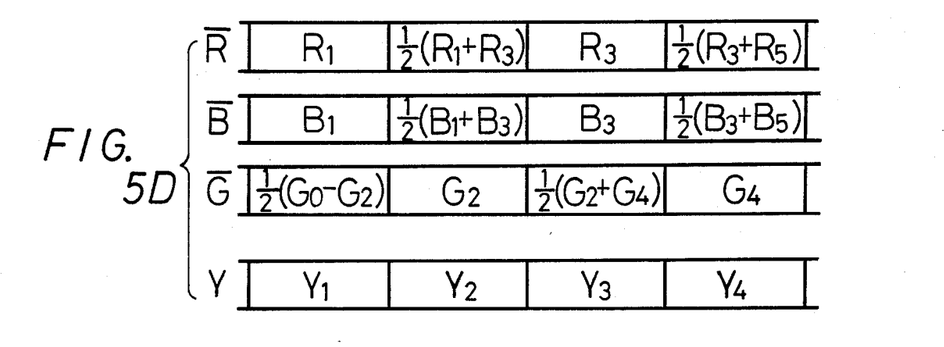
Figure 5E:
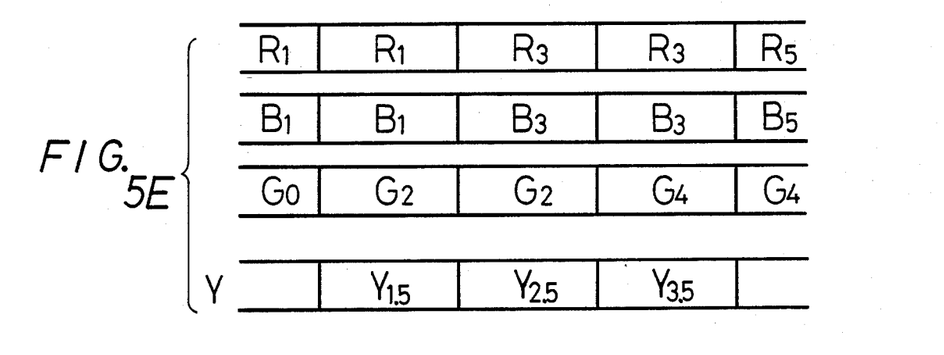

Further, the Y signal is produced from an R signal $\overline{R}$, B signal $\overline{B}$ and G signal $\overline{G}$ which are respectively provided by synthesizing the original data and those obtained by the average value interpolation, as shown in FIG. 5D. With regards to the Y signal, it may be possible that the R signal, B signal and G signal, each being interpolated by the prevalue holding and delayed by $\frac{1}{2}$ alignment pitch of the picture sensing units are used to produce signals $Y_{1.5}$, $Y_{2.5}$, $Y_{3.5}$, . . .

An example of the solid state color camera according to the present invention which employs such a pick-up system of $\frac{1}{2}$ alignment pitch displacement and three image sensors or CCDs on each of which an image is projected through optical lenses L1, L2, and L3 similar to that shown in FIG. 1.

Figure 7:
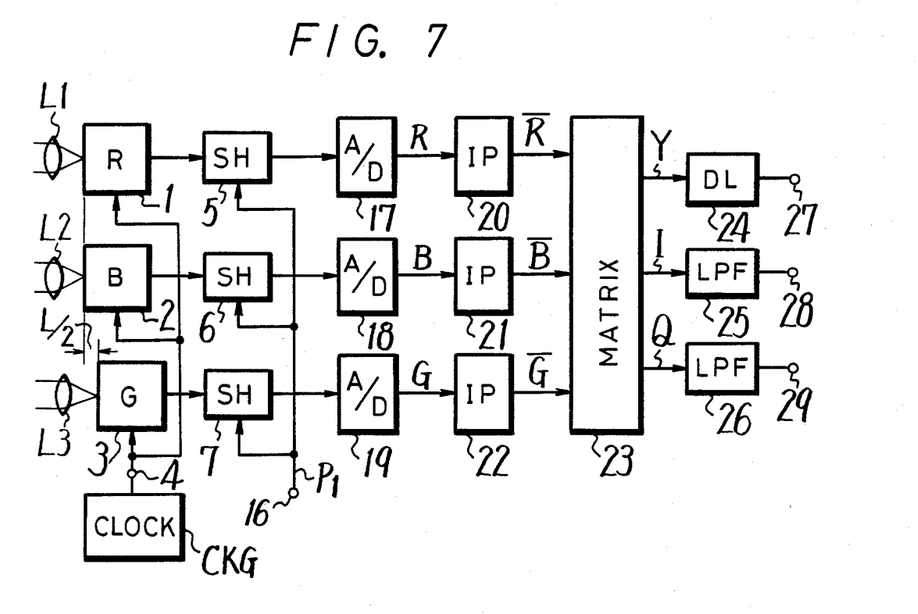
FIG. 7 is a systematic block diagram showing an example of the solid state camera according to the present invention.
Figures 8A, 8B:
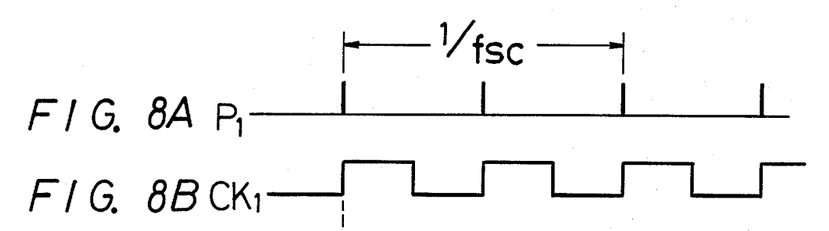
FIGS. 8A to 8J are respectively time charts used to explain the operation of the example of the invention shown in FIG. 7.

FIG. 7 shows in block an example of the solid state camera according to the invention. In this example, the outputs from the CCDs 1, 2 and 3, each having a plurality of picture sensing units, are respectively supplied to the sample and holding circuits 5, 6 and 7 which are supplied with a common sample pulse $P_1$ (refer to FIG. 8A) through a terminal 16. The outputs from the sample and holding circuits 5, 6 and 7 are respectively supplied to A/D (analog to digital) converters 17, 18 and 19 and then converted into digital signals R, B and G, for example, digital data of 8 bits per 1 sample, respectively. These digital color data are respectively fed to interpolation circuits 20, 21 and 22 and thereby average-value-interpolated, respectively. The output data $\overline{R}$, $\overline{B}$ and $\overline{G}$ from the interpolation circuits 20, 21 and 22 are all fed to a matrix circuit 23 which then produces Y, I and Q signals by the digital calculation. These signals are respectively supplied to a delay circuit 24 for phase-matching and low pass filters 25 and 26 of digital filter construction, whereby a delayed signal and the signals whose bands are restricted to 1.5 MHz and 0.5 MHz are respectively delivered to output terminals 27, 28 and 29.

With the example of the invention shown in FIG. 7, the signals are read out from the CCDs 1, 2 and 3 by the common drive pulse, sampled and held in the sample and holding circuits 5, 6 and 7 by the common sample pulse $P_1$ so that from the A/D converters 17 and 19 derived are color signals R and G as illustrated in FIG.

Figure 8C:
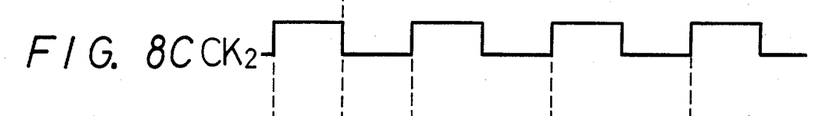
Figure 8D:
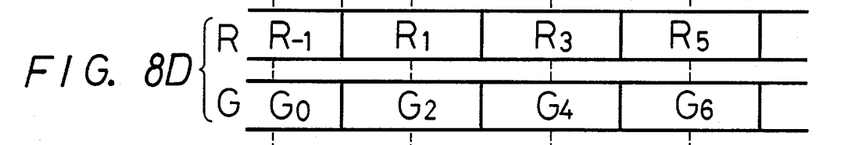

8D. Though not shown, the B signal is same as the R signal in timing.

Figure 8E:
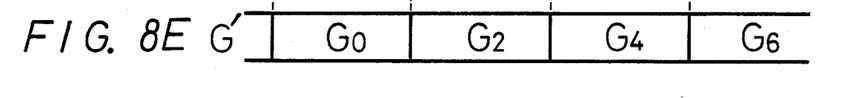
Figure 8F:
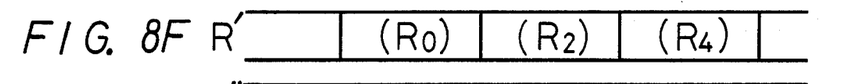
Figure 8G:
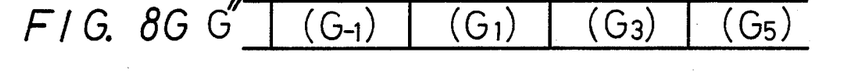
Figures 8H, 8I:
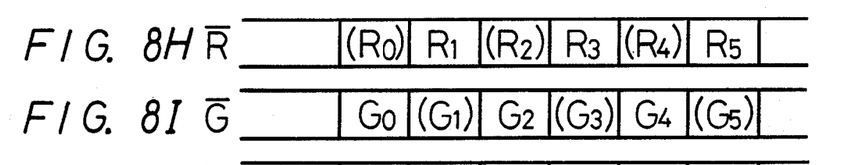
Figure 9A:
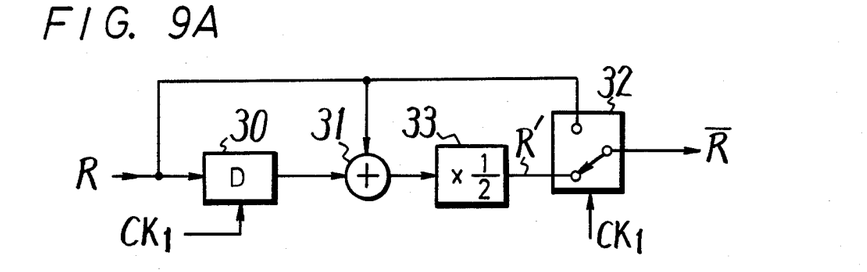
FIGS. 9A and 9B are respectively block diagrams showing parts of FIG. 7.
Figure 9B:
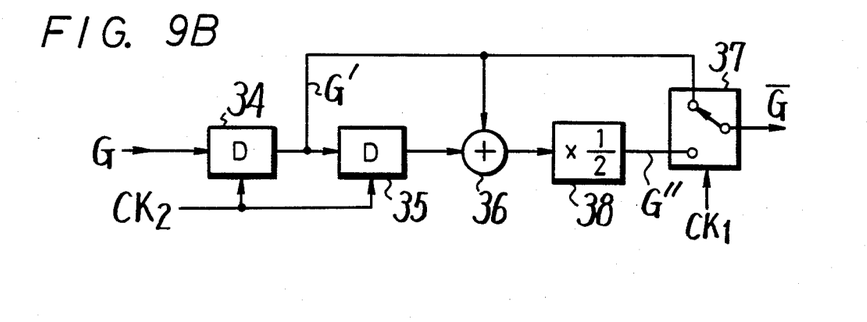

FIGS. 9A and 9B respectively show examples of the interpolation circuits 20 and 22. The interpolation circuit 21 is same as that 20 in circuit construction. At first, the interpolation circuit 20 will be described. As shown in FIG. 9A, the R signal from the A/D converter 17 (refer to FIG. 7) is fed to a delay circuit 30, an adding circuit 31 and a switch circuit 32 at its one input terminal. The delay circuit 30 is operated by a pulse $CK_1$ shown in FIG. 8B to delay the input signal thereto by the time corresponding to the period ($\frac{1}{2}$ fsc) of the pulse $CK_1$ and then to supply the delayed signal to the adding circuit 31. For example, when the sampled data of $R_1$ is fed to the interpolation circuit 20, at the output of the delay circuit 30 derived a sampled data $R_{-1}$ before the former. Accordingly, at the output of the adding circuit 31 obtained is a data $(R_{-1}+R_1)$ which is fed to a multiplying circuit 33 to be multiplied by $\frac{1}{2}$ as data R'. The data R' are supplied to the switch circuit 32 at its other input terminal. If a sampled data $\frac{1}{2}(R_{i-1}+R_{i+1})$ which is provided by the average value interpolation of the before and post sample data $R_{i-1}$ and $R_{i+1}$ is represented by $R_i$, the signal R' consisting of interpolated data $(R_0), (R_2), \ldots$ shown in FIG. 8F is produced at the output of the multiplying circuit 33. Since the switch circuit 32 alternately selects the input signal R and the signal R' by the pulse $CK_1$, an interpolated R signal $\overline{R}$ shown in FIG. 8H is derived from the switch circuit 32.

Figure 8J:
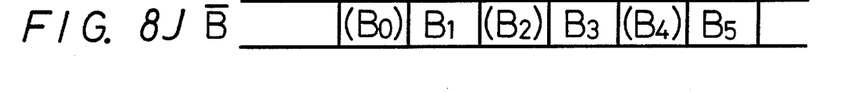

Similar to the case of the R signal, from the interpolation circuit 21, provided is an interpolated B signal $\overline{B}$ shown in FIG. 8J.

With the interpolation circuit 22, as shown in FIG. 9B, the signal G from the A/D converter 19 (refer to FIG. 7) is fed to a delay circuit 34 whose output G' is applied to a delay circuit 35, an adding circuit 36 and a switch circuit 37 at its one input terminal. The output from the adding circuit 36 is fed to a multiplying circuit 38 whose output G" is applied to the switch circuit 37 at its other input terminal. The delay circuit 34 will latch the G signal by a pulse $CK_2$ shown in FIG. 8C and produce at its output the signal G' shown in FIG. 8E. This signal G' and the signal provided by delaying this signal G' through the delay circuit 35 by $\frac{1}{2}$ fsc are both fed to the adding circuit 36 which then produces outputs $G_0+G_2, G_2+G_4, \ldots$ These outputs are multiplied by $\frac{1}{2}$ in the multiplying circuit 38 as the output G". If a sampled data $\frac{1}{2}(G_{i-1}+G_{i+1})$ which is obtained by the average value interpolation of the before and post sampled data $(G_{i-1}+G_{i+1})$ is represented by $G_i$, the signal G" becomes as shown in FIG. 8G. The switch circuit 37 is changed over by the pulse $CK_2$ to provide an interpolated signal $\overline{G}$ shown in FIG. 8I. The switch circuit 37 is operated to select the interpolated data during the low-level period of the pulse $CK_1$ opposite to the switch circuit 32.

The matrix circuit 23 uses the above-mentioned interpolated data $\overline{R}$, $\overline{B}$ and $\overline{G}$ and produces the Y signal and two color difference signals I and Q.

Figure 10:
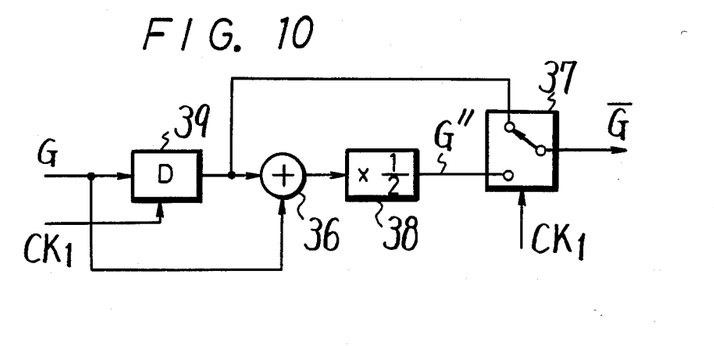
FIG. 10 is a block diagram showing another example of one of the parts shown in FIG. 9B.
Figure 11A:
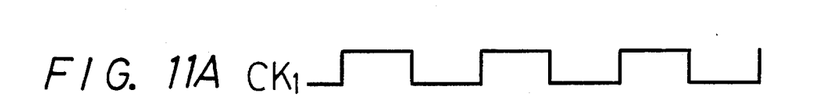
FIGS. 11A to 11H are respectively time charts used to explain the operation of the invention shown in FIG. 7 in which the part shown in FIG. 10 is employed.
Figure 11B:
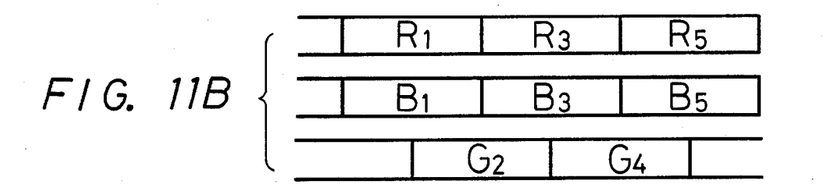
Figure 11C:
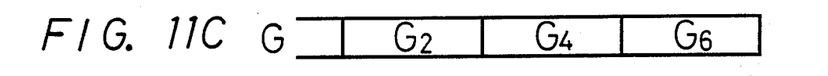
Figure 11D:
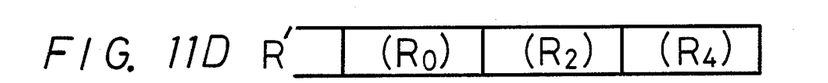
Figure 11E:
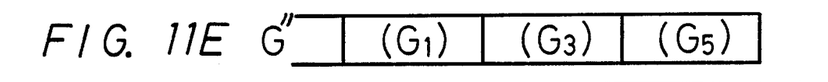
Figure 11F:
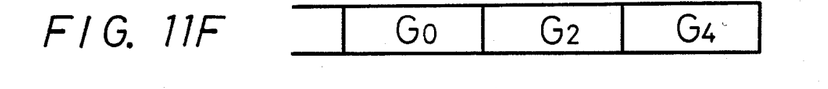
Figure 11G:
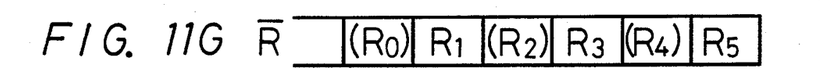
Figure 11H:
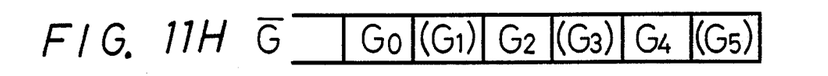
Figure 12:
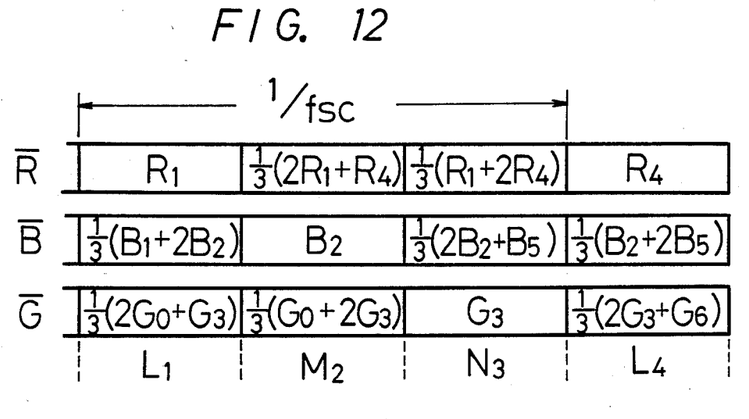
FIG. 12 is a time chart used to explain another example of the invention.

FIG. 10 shows another example of the interpolation circuit 22 for the G signal. In this example, the G signal from the A/D converter 19 is supplied to a delay circuit 39. The signal G and the delayed signal by the delay circuit 39 are both fed to the adding circuit 36. The delay circuit 39 is operated by a pulse $CK_1$ shown in FIG. 11A which is similar to that shown in FIG. 8B. The output from the adding circuit 36 is multiplied by $\frac{1}{2}$ in the multiplying circuit 38 as the G" signal which consists of average interpolated data $(G_1)=\frac{1}{2}(G_0+G_2)$, $(G_3)=\frac{1}{2}(G_2+G_4), \ldots$ as shown in FIG. 11E. FIG. 11B shows the displacements of picture sensing units in the respective CCDs 1, 2 and 3 shown in FIG. 7, and FIG. 11C shows the G signal which is read out from the CCD 3 simultaneously with the reading of the CCDs 1 and 2. FIG. 11F depicts the signal appearing at the output of the delay circuit 39. This signal shown in FIG. 11F and the signal G" shown in FIG. 11E are alternately selected by the switch circuit 37. As a result, from the switch circuit 37 derived is an interpolated G signal $\overline{G}$ shown in FIG. 11H. In this case, the interpolation circuits 20 and 21 for the R and B signals are each same as that shown in FIG. 9A, and from the interpolation circuit 20 obtained is an interpolated R signal $\overline{R}$ shown in FIG. 11G.

Figure 13:
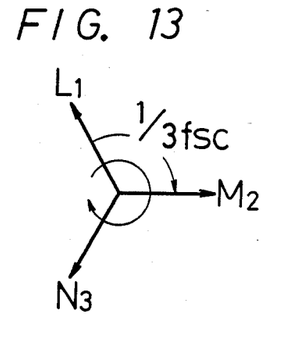
FIG. 13 is its vector diagram.

FIGS. 12A, 12B, 12C and 12D respectively show interpolated color signals OS/R/ $\overline{R}$, $\overline{B}$ and $\overline{G}$ which are obtained by the pick-up method under the displacement of $\frac{1}{3}$ alignment pitch of the picture sensing units to which this invention is applied. In case of $\frac{1}{3}$ alignment pitch displacement, three displaced CCDs are together driven by the clock of fsc so that one of the R, B and G signals, which are read out from the CCDs simultaneously, is taken as a reference and the remaining two signals are delayed to achieve a first interpolation. For example, by using sample data $R_1$ and $R_2$ from a CCD, the following calculations $$(R_2)=\tfrac{1}{3}(2R_1+R_4)$$

$$(R_3)=\tfrac{1}{3}(R_1+2R_4)$$

are performed to provide interpolated data $(R_2)$ and $(R_3)$, respectively. Based upon such interpolated signals $\overline{R}$, $\overline{B}$ and $\overline{G}$, color difference signals L, M and N are respectively provided. As represented by the circulating vector in FIG. 13, there color difference signals are subjected to 3-phase digital modulation processing to be carrier color signal.

Figure 14:
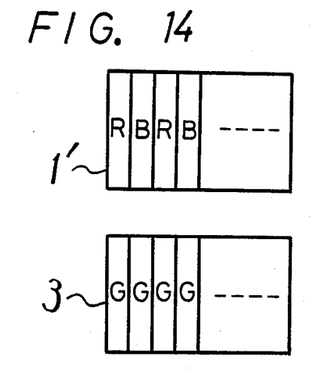
FIG. 14 is a schematic diagram showing the main part of a further example of the invention.
Figure 15:
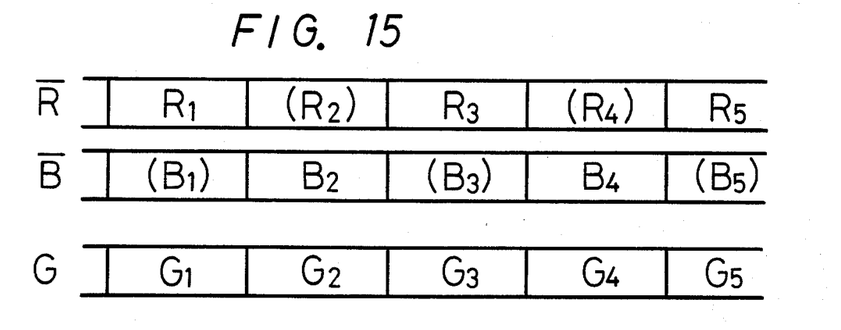
FIG. 15 is a time chart used to explain the example shown in FIG. 14.

FIG. 14 shows the main part of a further example of the invention in which a single CCD 1' is used to generate the R and B signals and another single CCD 3 is used to generate the G signal. That is, FIG. 14 shows the main part of a so-called 2-CCD system solid state color camera according to this invention. In this example, since the R and B signals are delivered from the CCD 1' in a do-sequential manner, they are separated and then subjected to the average value interpolation to provide interpolated R and B signals $\overline{R}$ and $\overline{B}$ as shown in FIGS. 15A and 15B. Thus, if these interpolated signals $\overline{R}$ and $\overline{B}$ and the G signal from the CCD 3 shown in FIG. 15C are supplied to the matrix circuit, the Y signal and two color difference signals can be provided.

As will be understood from the description on the examples of the present invention, according to the present invention, when the color signals different in spatial sampling position are subjected to the digital processing to synthesize two color difference signals, the error similar to the misregistration can be prevented from being generated.

The above description is given on preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A solid state camera comprising:
   (A) a plurality of image sensors, each having a plurality of picture sensing units spaced apart by an alignment pitch;
   (B) means for projecting an image simultaneously on each of said image sensors;
   (C) means for displacing the image on each sensor by a predetermined distance in a given direction with respect to at least one other of said sensors;
   (D) reading means coupled to said picture sensing units for reading said respective images sequentially in said given direction and for generating video signals representing said respective images;
   (E) means for sampling each of said video signals by a sampling signal and for generating sampled signals;
   (F) means for converting said sampled signals to digital signals,
   (G) means for interpolating a signal generated from the digital signal during adjacent two samples between said adjacent two samples in each video signal and for generating interpolated outputs so that the group delay characteristics of said outputs are substantially equivalent, and
   (H) means for synthesizing said interpolated outputs and for generating a desired signal.

2. A solid state camera according to claim 1, wherein said reading means includes a clock generator for generating a reading clock with the frequency of 2 fsc wherein fsc is the frequency of color subcarrier.

3. A solid state camera according to claim 2, wherein the frequency of said sampling signal is 2 fsc and the predetermined distance is a half of said alignment pitch.

4. A solid state camera according to claim 3, wherein said plurality of image sensors are for generating red, green and blue primary color signals and said displacing means displaces the image corresponding to the green primary color signal with respect to other of said sensors.

5. A solid state camera according to claim 4, wherein said synthesizing means generates two color difference signals and a luminance signal.

6. A solid state camera according to claim 4, wherein said interpolating means includes three interpolating circuits for red, green and blue primary color signals and two of said interpolating circuits for red and blue primary color signals are substantially identical.

7. A solid state camera according to claim 6, wherein one of said interpolating circuits for the red or blue primary color signal and said interpolating circuit for the green primary color signal each include a delay circuit for delaying the digital signal by one period of said sampling signal, an averaging circuit for averaging said digital signal and the delayed signal and a signal selecting circuit for selecting one of the digital signal and the output of said averaging circuit whereby the output signal of said signal selecting circuit being the interpolated signal, and another interpolating circuit includes a delay circuit for delaying the digital signal by one period of said sampling signal, an averaging circuit for averaging said digital signal and the delayed signal and a signal selecting circuit for selecting one of said delayed signal and the output signal of said averaging circuit whereby the output signal of said signal selecting circuit being the interpolated signal.

8. A solid state camera according to claim 1, wherein said plurality of image sensors are for generating red, green and blue primary color signals, and said displacing means displaces the image on each sensor by one third of said alignment pitch with respect to other two sensors.

9. A solid state camera according to claim 8, wherein said interpolating means includes an interpolating signal generator for generating two sets of signals from the digital signal of adjacent two samples, said two sets of signals being sum of the weighted digital signal of the adjacent two samples, and an interpolating circuit for interpolating said two sets of signals between said adjacent two samples.

* * * * *